US010643183B2

United States Patent
Tian et al.

(10) Patent No.: US 10,643,183 B2
(45) Date of Patent: May 5, 2020

(54) SEARCH ENGINE

(71) Applicant: Google LLC, Mountain View, CA (US)

(72) Inventors: Ye Tian, Santa Clara, CA (US); Seyed Reza Mir Ghaderi, San Jose, CA (US); Xuejun Tao, San Jose, CA (US); Matthew Courtney, Sunnyvale, CA (US); Pei-Chun Chen, Mountain View, CA (US); Christian Posse, Belmont, CA (US)

(73) Assignee: Google LLC, Mountain View, CA (US)

( * ) Notice: Subject to any disclaimer, the term of this patent is extended or adjusted under 35 U.S.C. 154(b) by 259 days.

(21) Appl. No.: 15/296,230

(22) Filed: Oct. 18, 2016

(65) Prior Publication Data

US 2018/0107983 A1 Apr. 19, 2018

(51) Int. Cl.
*G06Q 10/10* (2012.01)
*G06Q 10/06* (2012.01)
(Continued)

(52) U.S. Cl.
CPC ... *G06Q 10/1053* (2013.01); *G06F 16/24578* (2019.01); *G06F 16/9535* (2019.01);
(Continued)

(58) Field of Classification Search
CPC .............. G06Q 10/105; G06Q 10/1053; G06F 16/9535; G06F 16/24578; G06N 20/00; G06N 5/022
(Continued)

(56) References Cited

U.S. PATENT DOCUMENTS

2006/0026152 A1* 2/2006 Zeng ...................... G06F 16/951
2006/0229899 A1* 10/2006 Hyder ............... G06F 17/30873
705/1.1
(Continued)

OTHER PUBLICATIONS

'www.onetsoautocoder.com' [online] "O*Net-SOC AutoCoder v12.1.1: Home and FAQ" 2017 [retrieved on Sep. 11, 2017] Retrieved from Internet: URL<http://www.onetsocautocoder.com/plus/onetmatch> "Home", and <http://www.onetsocautocoder.com/plus/onetmatch?action=guide> "FAQ", 4 pages.

*Primary Examiner* — Jonathan P Ouellette
(74) *Attorney, Agent, or Firm* — Fish & Richardson P.C.

(57) ABSTRACT

Methods, systems, and apparatus, including computer programs encoded on storage devices, for performing a job opportunity search. In one aspect, a system includes a data processing apparatus, and a computer-readable storage device having stored thereon instructions that, when executed by the data processing apparatus, cause the data processing apparatus to perform operations. The operations include defining a vector vocabulary, defining an occupation taxonomy that includes multiple different occupations, obtaining multiple labeled training data items, wherein each labeled training data item is associated with at least (i) a job title, and (ii) an occupation, generating, for each of the respective labeled training data items, an occupation vector that includes a feature weight for each respective term in the vector vocabulary, and associating each respective occupation vector with an occupation in the occupation taxonomy based on the occupation of the labeled training data item used to generate the occupation vector.

12 Claims, 5 Drawing Sheets

(51) Int. Cl.
   *G06Q 30/08* (2012.01)
   *G06Q 30/02* (2012.01)
   *G06F 16/9535* (2019.01)
   *G06F 16/2457* (2019.01)
   *G06N 20/00* (2019.01)
   *G06N 5/02* (2006.01)

(52) U.S. Cl.
   CPC .......... *G06Q 10/105* (2013.01); *G06N 5/022* (2013.01); *G06N 20/00* (2019.01)

(58) Field of Classification Search
   USPC .................................................. 705/1.1–912
   See application file for complete search history.

(56) References Cited

U.S. PATENT DOCUMENTS

| | | | |
|---|---|---|---|
| 2007/0136256 A1* | 6/2007 | Kapur .................... | G06Q 30/02 |
| 2008/0065633 A1 | 3/2008 | Luo et al. | |
| 2008/0086366 A1 | 4/2008 | Concordia et al. | |
| 2014/0074738 A1* | 3/2014 | Thankappan ...... | G06Q 10/1053 |
| | | | 705/321 |
| 2014/0075004 A1* | 3/2014 | Van Dusen ............ | H04L 41/04 |
| | | | 709/223 |
| 2014/0324721 A1* | 10/2014 | Rennison ........... | G06Q 50/2057 |
| | | | 705/321 |
| 2018/0189380 A1* | 7/2018 | Holtz ...................... | G06F 16/33 |

\* cited by examiner

SEARCH ENGINE

BACKGROUND

This specification relates to search engines.

A search engine may generally be described as any program that executes a search and retrieves stored data. However, based on the task at hand, a search engine can be configured in a variety of different ways. For example, some search engines may be configured to perform keyword-based search and retrieval. Such search engines may identify relevant search results based, at least in part, on the number of times a search term appears in a particular resource, or the particular resource's metadata. Alternatively, or in addition, some search engines may identify search results as being responsive to a query because a resource provider paid the search engine provider a sum of money to return the provider's resource(s) in response to search queries that include a particular search term. However, the aforementioned ways that a search engine can identify search results responsive to a query are merely exemplary.

A search engine can also be configured to identify search results responsive to a query in a variety of other ways. A custom configuration of a search engine can be employed, as necessary, to solve particular problems related to search and retrieval. Customizing a search engine can include altering the way a search engine executes a search, identifies relevant search results, ranks identified search results, or the like.

SUMMARY

In some implementations, a job identification model is provided that enhances job search by improving the quality of search results provided in response to a job search query. The search results are improved because the job identification model is capable of identifying relevant job postings that would otherwise go unnoticed by conventional algorithms due to the inherent limitations of keyword-based searching. By employing additional methods other than, or in addition to, conventional keyword-based searching, the job identification model can identify relevant job postings that include job titles that do not match the keywords of a received job search query. For example, in response to a job search query that seeks job opportunities for a "Patent Guru," the job identification model may identify job postings related to a "Patent Attorney," an "Intellectual Property Attorney," an "Attorney," or the like.

According to one implementation, the subject matter of this specification may be embodied in a method to facilitate job searching. The method may include actions of defining a vector vocabulary, defining an occupation taxonomy that includes multiple different occupations, obtaining multiple labeled training data items, wherein each labeled training data item is associated with at least (i) a job title, and (ii) an occupation, generating, for each of the respective labeled training data items, an occupation vector that includes a feature weight for each respective term in the vector vocabulary, associating each respective occupation vector with an occupation in the occupation taxonomy based on the occupation of the labeled training data item used to generate the occupation vector, receiving a search query that includes a string related to a characteristic of one or more potential job opportunities, generating a first vector based on the received query, determining, for each respective occupation of the multiple occupations in the occupation taxonomy, a confidence score that is indicative of whether the query vector is correctly classified in the respective occupation, selecting the particular occupation that is associated with the highest confidence score, obtaining one or more job postings using the selected occupation, and providing the obtained job postings in a set of search results in response to the search query.

Other versions include corresponding systems, apparatus, and computer programs to perform the actions of methods defined by instructions encoded on computer storage devices.

In one implementation, the subject matter of this specification may be embodied in a system that trains an occupation taxonomy to facilitate job search. The system may include one or more data processing apparatus, and one or more computer-readable storage devices having stored thereon instructions that, when executed by the one or more data processing apparatus, cause the one or more data processing apparatus to perform operations. The operations include defining a vector vocabulary, defining an occupation taxonomy that includes multiple different occupations, obtaining multiple labeled training data items, wherein each labeled training data item is associated with at least (i) a job title, and (ii) an occupation, generating, for each of the respective labeled training data items, an occupation vector that includes a feature weight for each respective term in the vector vocabulary, and associating each respective occupation vector with an occupation in the occupation taxonomy based on the occupation of the labeled training data item used to generate the occupation vector.

Other versions include corresponding methods, apparatus, and computer programs to perform the actions of the methods defined by instructions encoded on computer storage devices.

In one implementation, the subject matter of this specification may be embodied in a computer-readable storage device having stored thereon instructions, which, when executed by a data processing apparatus, cause the data processing apparatus to perform operations. The operations may include receiving a search query that includes a string related to a characteristic of one or more job opportunities, generating, based on the received query, a query vector that includes a feature weight for each respective term in a predetermined vector vocabulary, determining, for each respective occupation of the multiple occupations in the occupation taxonomy, a confidence score that is indicative of whether the query vector is correctly classified in the respective occupation, selecting the particular occupation that is associated with the highest confidence score, obtaining one or more job postings using the selected occupation, and providing the obtained job postings in a set of search results in response to the search query.

Other versions include corresponding methods, system, and apparatus to perform the actions of methods defined by instructions encoded on computer storage devices.

These and other versions may optionally include one or more of the following features. For instance, in some implementations, defining a vector vocabulary may include generating a vector vocabulary that includes terms that are present in at least one training data item stored in a text corpus and terms that are not present in at least one training data item stored in the text corpus. Alternatively, or in addition, defining a vector vocabulary may include generating a vector vocabulary that includes only terms that are present in at least one training data item stored in a text corpus.

In some implementations, the feature weight may be based, at least in part, on a first value representing a term frequency that is determined, based at least in part, on a number of occurrences of each respective term in the job title of the respective training data item. Alternatively, or in addition, the feature weight may be based, at least in part, on a second value representing an inverse occupation frequency that is determined based, at least in part, on a number of occupations in the occupation taxonomy where each respective term in the job title of the respective training data item is present. Alternatively, or in addition, the feature weight may be based, at least in part, on a third value representing an occupation derivative that is based, at least in part, on a density of each respective term in the job title of the respective training data item across each of the respective occupations in the occupation taxonomy.

In some implementations, the feature weight may be based, at least in part, on both (i) a second value representing the inverse occupation frequency that is determined based, at least in part, on a number of occupations in the occupation taxonomy where each respective term in the job title of the respective training data item is present and (ii) a third value representing an occupation derivative that is based, at least in part, on a density of each respective term in the job title of the respective training data item across each of the respective occupations in the occupation taxonomy. Alternatively, the feature weight may be based on a sum of (i) the second value representing the inverse occupation frequency, and (ii) one-third of the third value representing the occupation derivative.

In some implementations, the predetermined vector vocabulary may include terms that are present in at least one training data item stored in a text corpus and terms that are not present in at least one training data item stored in the text corpus.

These and other versions each may optionally include one or more of the following features.

The details of these, and other, implementations are set forth in the accompanying drawings and the description below. Other features and advantages will be apparent from the description and drawings, and from the claims.

DETAILED DESCRIPTION

Figure 1:
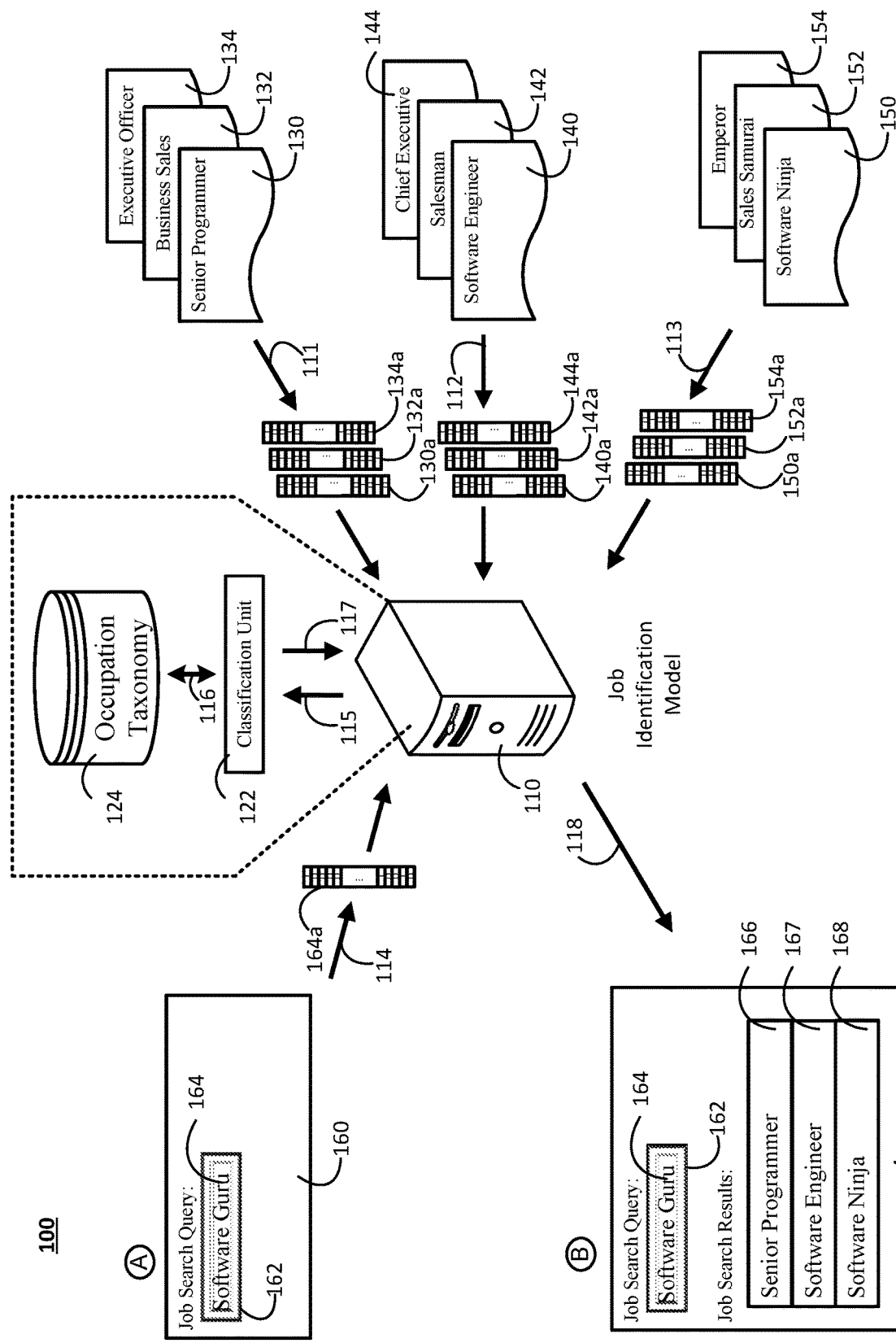
FIG. 1 is a contextual diagram of an example of system that facilitates job search and retrieval using a job identification model.

FIG. 1 is a contextual diagram of an example of system 100 that facilitates job search and retrieval using a job identification model 110.

The system 100 includes a job identification model 110 and at least one user device that displays a user interface 160. The job identification model 110 may be configured to obtain job posting data from multiple different computers via one or more networks such as a WAN, LAN, a cellular network, the Internet, or a combination thereof. For example, the job identification model 110 may obtain 111 job posting data associated with a first employer for a senior programmer 130, business sales 132, and an executive officer 134 from a first computer via one or more networks. Similarly, for example, the job identification model 110 may obtain 112, job posting data for a "Software Engineer" 140, a "Salesman" 142, and a "Chief Executive" 144 from a second computer via one or more networks. Furthermore, for example, the job identification model 110 may obtain 113 the job posting data for a "Software Ninja" 150, a "Sales Samurai" 152, and an "Emperor" 154 from a third computer via one or more networks. Job posting data, also referred to as a job posting, may include, for example, one or more terms describing a job opportunity that is made available by an employer.

Each respective job posting 130, 132, 134, 140, 142, 144, 150, 152, 154 obtained 111, 112, 113 by the job identification model 110 from multiple different sources may be related to one or more occupations. An occupation may include a particular category that encompasses one or more job titles that describe the same profession. Two or more of the obtained 111, 112, 113 job postings may be related to the same, or substantially similar, occupation while using different terminology to describe a job title for each of the two or more particular job postings. Such differences in the terminology used to describe a particular job title of a job posting may arise for a variety of different reasons. First, and foremost, different people from different employers draft each respective job posting. As a result, each respective person's style may be different. Alternatively, or in addition, some employers may create unique job titles based on the culture of the employer's company, the employer's marketing strategy, or the like. For example, a first hair salon may be marketed as a rugged barber shop, and thus advertise a job posting for a "barber." Alternatively, a second hair salon may be marketed as a trendy beauty salon, and thus advertise a job posting for a "stylist." In both instances, however, the job posting is seeking a person to perform the occupation of a "hair dresser" that cuts and styles hair. In a search system limited to keyword based searching, a person seeking job opportunities for a "hair dresser" that searches for job opportunities using the term "barber" may not receive available job postings for a "stylist," "hair dresser," or the like if those job postings do not include the term "barber." Aspects of the present disclosure utilize a job identification model that seeks to address this problem.

Once the job identification model 110 obtains 111, 112, 113 the job postings, the job identification model 110 may generate an occupation vector 130a, 132a, 134a, 140a, 142a, 144a, 150a, 152a, 154a that corresponds to each respective job posting 130, 132, 134, 140, 142, 144, 150, 152, 154 that was obtained. The generated vector may provide a representation of the terms in a job posting that can be used to facilitate search and retrieval of job posting independent of merely matching keywords in a search query to terms in a job title. The respective vectors may have feature weights that are based on a frequency with which each particular word in the appears in a job post, a frequency with which each particular word appears in the title of the job post, a number of occupations in the occupations taxonomy where each particular word in the job title is present, the density of each particular word in the job title across each of the respective occupations in the occupation taxonomy, or the like.

The job occupation model 110 includes a classification unit 122 and an occupation taxonomy 124. The occupation taxonomy 124 is a taxonomy that associates known job titles from existing job posts with one or more particular occupations. During training, the job identification model 110 associates each respective occupation vector that was generated for an obtained job posting with an occupation in the occupation taxonomy 124. The classification unit 122 may receive 115 the search query 164 and generate a query vector 164a. The classification unit 122 may access 116 the occupation taxonomy 123 and calculate, for each particular occupation in the occupation taxonomy 124, a confidence score that is indicative of the likelihood that the query vector 164a is properly classified into each particular occupation of the multiple occupations in the occupation taxonomy 124. Then, the classification unit 122 may select the occupation that is associated with the highest confidence score as the occupation that is related to the query vector 164a and provide 117 the selected occupation to the job identification model 124.

By way of example, at stage A, a user may enter a search query 164 that includes the term "Software Guru" into a search box 162 of user interface 160. The search query may be received 114 by the job identification model 110 via one or more networks such as a LAN, a WAN, a cellular network, the Internet, or the like. Next, the job identification model 110 can provide an input 115 to the classification unit 122 that includes the query 164. The classification unit 122 may generate a query vector 164a. The classification unit 122 may analyze the query vector 164a in view of the one or more occupation vectors that were generated and associated with each particular occupation in the occupation taxonomy 124 such as occupation vectors 130a, 132a, 134a, 140a, 142a, 144a, 150a, 152a, 154a. The classification unit 122 can then determine that the query vector 164a is associated with a particular occupation based on a calculated confidence score, and select the particular occupation.

The job identification model 110 may receive 117 the particular occupation from the classification unit 122. Alternatively, or in addition, the output from the classification unit 122 may include a confidence score that indicates the likelihood that the query vector 164a is related to the occupation output by the occupation taxonomy 124. The occupation output from the occupation taxonomy 124 can be used to retrieve relevant job postings. Specifically, given the output of a particular occupation, the job identification model 110 can retrieve one or more job postings using a job posting index that stores references to job postings based on occupation type.

At stage B, the references to job postings that were identified using the job posting index are returned 118 to the user device via one or more networks such as a LAN, a WAN, a cellular network, the Internet or the like. The obtained references to job postings may be displayed on the graphical user interface 160. The obtained references to job postings may be presented as search results and include references to job postings for a "Senior Programmer," a "Software Engineer," a "Software Ninja," or the like. The job postings included in the search results were determined to be responsive to the search query "Software Guru" based at least in part on the vector analysis of the query vector 164a and one or more occupation vectors 130a, 132a, 134a, 140a, 142a, 144a, 150a, 152a, 154a used to train the occupation taxonomy and not merely based on keyword searching alone.

Figure 2:
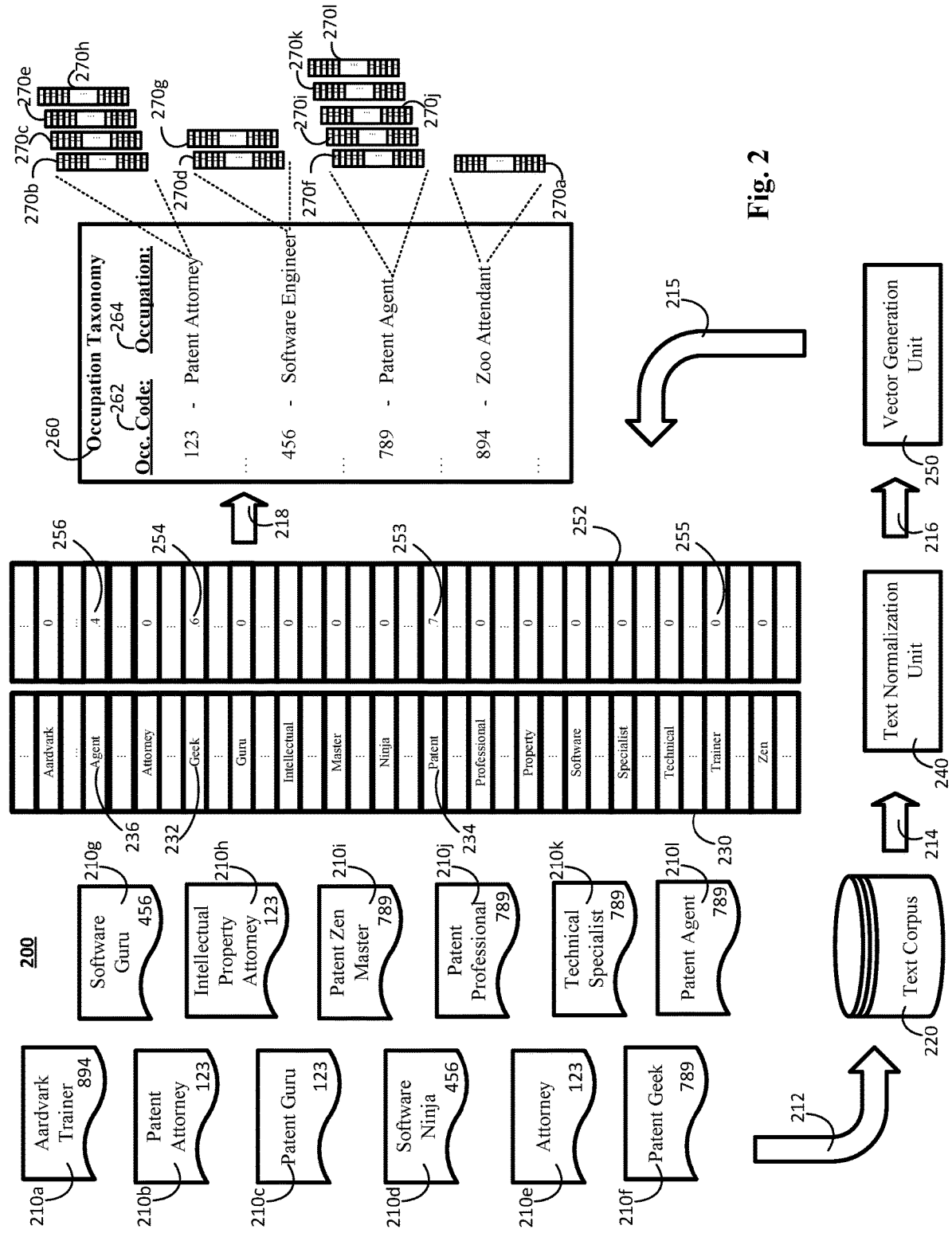
FIG. 2 is an example of a system for training an occupation taxonomy.

FIG. 2 is an example of a system 200 for training an occupation taxonomy 260. The system 200 includes a text corpus 220, a text normalization unit 240, a vector generation unit 250, and an occupation taxonomy 260. Each of the text corpus 220, text normalization unit 240, vector generation unit 250, and occupation taxonomy 260 may be hosted by one or more computers that can communicate with each other, if necessary, using one or more networks such as a LAN, a WAN, a cellular network, the Internet, or the like. The term "unit" will be used broadly to refer to a software based system or subsystem that can perform one or more specific functions. Generally, a unit will be implemented as one or more software modules or components, installed on one or more computers in one or more locations. In other cases, however, multiple units can be installed on the same computer or computers.

The system 200 includes one or more computers hosting a text corpus 220 that is configured to receive 212 one or more training data items 210a, 210b, 210c, 210d, 210e, 210f, 210g, 210h, 210i, 210j, 210k, 210l. The training data items 210a, 210b, 210c, 210d, 210e, 210f, 210g, 210h, 210i, 210j, 210k, 210l may include job postings, or a portion thereof, that are associated with at least a job title and an occupation type. In some implementations, the occupation type may include an occupation code. For example, the training data item 210f includes a job title "Patent Geek" and an occupation code "789" that corresponds to the occupation "Patent Agent." Similarly, for example, the training data item 210d includes a job title of "Software Ninja" and an occupation code "456" that corresponds to the occupation "Software Engineer." The occupation type associated with a particular training data item may be assigned, for example, by a human user that has reviewed the training data item in view of the occupation taxonomy.

A set of training data items may be accessed, and managed using a training data management tool. The training data management tool may facilitate collection, labelling, and editing functions. A user can use the training data management tool to access a training data item that is stored in the text corpus 220, and then label the training data item with a particular occupation. By way of example, a user can access the training data item 210c that includes a job title of "Patent Guru," review the job posting associated with the training data item, and determine that the job posting associated with training data item 210c is for the occupation "Patent Attorney." The user can then use the training data management tool to label the training data item 210c with an occupation code "123" corresponding to the occupation "Patent Attorney." The training data management tool may also organize training data items in the text corpus in a way that easily facilitates finding conflicting occupation code assignments for the same title. Though the training data management tool provides functionality necessary to access and label training data items, not all training data items used to train the occupation taxonomy 260 need to be manually labeled using the training data management tool. For example, in some implementations, all, or a portion of, the training data items may be obtained from a third-party system that has already labeled each training data item with necessary training labels such as an occupation code.

The training data items can include other data items instead of job postings. For example, the training data items may include job descriptions from one or more resumes. Alternatively, or in addition, the training data items may include job search queries, or a portion thereof. Other types of training data items may also fall within the scope of the present disclosure.

The text corpus 220 may be configured to receive 212 and store training data items such as training data item 210f that includes a job title of "Patent Geek." In addition, it is assumed for purposes of the example of FIG. 2, that the training data item 210f is also associated with an occupation of "Patent Agent." The text corpus 220 may include any database that is capable of receiving and storing training data items such as training data items 210a, 210b, 210c, 210*d*, 210*e*, 210*f*, 210*g*, 210*h*, 210*i*, 210*j*, 210*k*, 210*l*. In some implementations, the text corpus 220 may receive and store thousands of training data items, tens of thousands of training data items, millions of training data items, or more.

The text normalization unit 220 is configured to obtain 214 training data items stored in the text corpus and normalize the job titles that are associated with each respective training data item 210*a*, 210*b*, 210*c*, 210*d*, 210*e*, 210*f*, 210*g*, 210*h*, 210*i*, 210*j*, 210*k*, 210*l* stored by the text corpus 220. In some implementations, the normalization process performed by the text normalization unit 220 may be performed solely on the job title associated with the received job posting. Alternatively, or in addition, the normalization process performed by the text normalization unit 220 may be performed on other portions of a job posting. Normalizing a job posting may include, for example, removal of noise that exists in one or more portions of a job posting. In some implementations, the text normalization unit 220 may normalize particular portions of the job postings such as the job title. The normalization unit 220 may normalize each job title that is received and stored in the text corpus. For example, the normalization unit 220 may normalize the job title of the training data item 210*f* which recites "Patent Geek."

The text normalization unit 220 may parse the obtained job title into structured segments that include, for example, title, seniority, employment type, salary, location, and company. Normalization may include removing noisy characters are cleaned from the title string. Removing noisy characters from the title string may include removing any parentheses that exist in the job title. For example, parentheses are removed if the whole title is wrapped around parentheses. Then, for the resulting title, normalization unit may identify the longest substring wrapped by parentheses and remove the substring. The normalization unit 220 may continue this parentheses removal process until no closed parentheses is found. Alternatively, or in addition, trailing dots of each token in the title may be trimmed. In some implementations, the normalization unit 220 may replace multiple consecutive dots with space. For example, using normalization operations to remove each trailing dot from a job title extracted from a job posting such as "exec. cust. service" may result in a normalized job title of "exec cust service". Alternatively, in some implementations, only trailing dots that occur at a token boundary such as a space may be removed. For example, using normalization operations to remove trailing dots that occur at a token boundary such as a space from a job title of "exec./cust. service" may result in a normalized job title of "exec./cust service".

Alternatively, or in addition, the text normalization unit 220 may remove/replace punctuations, numbers, and non-ascii characters if they are not in the white-listed phrases. For example, using a normalization operation that removes numbers from a job title such as "3 drivers, paid well" may result in a normalized job title of "drivers paid well". Alternatively, or in addition, the normalization unit 220 may access a black-list of prohibited terms, and remove black-listed terms from the job posting. Alternatively, or in addition, the normalization unit 220 may remove duplicate tokens.

The normalization unit 220 can also determine whether a job title includes additional information such as employment type, salary, shift schedule, work schedule, or the like. If additional information such as employment type, salary, work schedule, or the like exist in a job title the normalization unit 220 may annotate and cleanse the additional information. Cleansing the additional information may include removing the additional information.

With respect to salary information, the normalization unit 220 may determine if any phrase is composed of a required digit, optional dot, an optional range sign, a pay frequency pattern, or the like and a required currency sign (e.g., "$"). If it is determined that a phrase includes salary information such as a required digit, optional dot, an optional range sign, a pay frequency pattern, or the like and a required currency sign (e.g., "$"), then the salary information is removed. In some implementations, detecting some of the employment type phrases may be highly dependent on anchors that have punctuations and numbers such as "34 $/hr", "8-am/10-pm", or the like that may need to be handled before cleaning those characters, otherwise they become indistinguishable from valid job titles such as "hr". By way of example, assume a job title of "$10.00 per hr f/t teller". Using normalization operations to remove salary information from a job title of "$10.00 per hr f/t teller" may result in a normalized job title of "f/t teller".

With respect to shift schedules, the normalization unit 220 may determine if any phrase is composed of a digit, an optional range sign, or the like and a shift schedule pattern. If it is determined that a phrase includes shift information such as a digit, an optional range sign, or the like and a shift schedule pattern, then the shift schedule pattern is removed.

With respect to work schedules, the normalization unit 220 may determine if any phrase that is composed of a digit, optional range, or the like and at least one of "pm," "am," "th," "rd," "st," "nd," or the like. If it is determined that a phrase includes work schedule information such as a digit, optional range, or the like and at least one of "pm," "am," "th," "rd," "st," "nd," or the like, then the work schedule information is removed. By way of example, using normalization operations to remove work schedule information from a job title that includes "4-10 hours shift labor" may result in a normalized job title of "labor". Similarly, by way of another example, using normalization operations for removal of work schedule information from respective job titles of "4-8 pm labor", "4 am-8 pm labor", "8 pm-4 am labor" may result in the same normalized job title of "labor" for each respective job title.

The normalization unit 220 can also determine whether a job title includes location information or company names. If the normalization unit 220 determines that a job title includes location information or company names, then the location information and company names can be removed. The location of the job posting may be maintained in other ways. For example, a knowledge graph can be used to annotate the likely zip code, city, county, country, area, and companies. The most confident annotation may be adopted, and the corresponding entity is removed from the portion of the job posting such as the job title. Similarly, company names may also be removed from job titles. For example, using normalization operations to remove company information from a job title such as "store manager dressbarn" may result in a normalized job title of "store manager."

The normalization unit 220 may perform other normalizing operations that include, for example, determining whether to keep or remove terms in a job title related to seniority. In some implementations, for example, the normalization unit 220 may determine to keep seniority terms in a portion of a job listing such as the job title. In other implementations, for example, the normalization unit 220 may determine to remove seniority terms from a portion of the job listing such as the job title. When the normalization unit 220 is configured to remove seniority terms from a portion of the job listing such as a job title, the normalization unit may treat seniority words as black-listed terms. Seniority terms may include, for example, "recent graduate," "new graduate," "entry level," "mid-level," "senior level," "junior," "senior," "assistant," "intern," "level 1," "level 2," "level 3," or the like.

In some implementations, two or more of the normalization operations may be applied to a single job title. For example, applying normalization operations with respect to parentheses, location, and work schedule to a job title extracted from a job posting such as "(software engineer, (mountain view, (main campus)) temporary (hourly))" may result in a normalized job title of "software engineer, temporary".

The aforementioned example describes the normalization process in the context of training the occupation taxonomy. However, the same normalization process employed by the text normalization unit 240 may also be utilized in other aspects of the present disclosure. For example, the normalization process may also be applied to one or more terms of a job search query that are received by the job identification model. Alternatively, or in addition, for example, the normalization process may also be applied to job descriptions found in a resume. Alternatively, or in addition, for example, the normalization process may be applied to newly identified job postings that are identified and stored. That is, any job title associated with any source can be normalized using the text normalization unit 240.

The system 200 also includes one or more computers hosting a vector generation unit 250. The vector generation unit 250 is configured to receive 216 a normalized job title that is associated with a training data item such as training data item 210f that is stored in the text corpus. The vector generation unit 250 is configured to generate an occupation vector 252 that includes a numerical representation of the received 216 job title that can be used to classify the job title 216 using the occupation taxonomy 260. The numerical representation of the received 216 job title created by the occupation vector 252 may provide an indication as to one or more particular relationships between the job title and the vector vocabulary 230.

The vector vocabulary 230 is generated based on the terms included in the text of training data items 210a, 210b, 210c, 210d, 210e, 210f, 210g, 210h, 210i, 210j, 210k, 210l stored in the text corpus 220, terms that are not included in the text of training data items 210a, 210b, 210c, 210d, 210e, 210f, 210g, 210h, 210i, 210j, 210k, 210l stored in the text corpus 220, or a combination thereof. With reference to the example of FIG. 2, the vector vocabulary 230 includes terms included in the text of training data items 210a, 210b, 210c, 210d, 210e, 210f, 210g, 210h, 210i, 210j, 210k, 210l such as "Aardvark," "Agent," "Attorney," "Guru," "Geek," "Intellectual," "Master," "Ninja," "Patent," "Professional," "Property," "Software," "Specialist," "Technical," "Trainer," and "Zen." The terms "Geek" 232 and "Patent" 234 may be derived from the job title associated with training data item 210f. The vector vocabulary 230 may also include other terms found in other training data items stored in the text corpus 220. The aforementioned terms may include unigrams, bigrams, skip-1 bigrams stemmed using Porter Stemmer algorithm, or the like. The size of the vector vocabulary V may be referred to as N. Each word W in the vector vocabulary 230 may have a unique index from 0 to N, ($W_i$: i), i[0, 1, . . . , N−1]. The vector vocabulary may be dynamically built during the offline training process, and then become fixed, and referred to as a predetermined vector vocabulary, after the offline training phase is complete.

The vector generation unit 250 may generate an occupation vector for each job title of each training data item stored in the text corpus 220. An occupation vector may include multiple numerical feature values that are collectively representative of a particular training data item. Each numerical value of the multiple numerical values may be referred to as a feature weight that is indicative of a particular relationship between a particular feature of a particular job title of a particular training data item and a respective term of the vector vocabulary 230 with which the feature weight is associated. For example, the vector generation unit 250 may generate a feature weight 253 that is associated with the vector vocabulary term "Patent" and a feature weight 254 that is associated with the vector vocabulary term "Geek." Such feature weights may be generated as an indication that the job title includes the vector vocabulary terms "Patent" and "Geek." One or more characteristics of the job title may influence the different in values that may result for one or more feature weights. For instance, the first word of a job title may be determined to be more important than subsequent words, subsequent words may be determined to be more important than initial words, or the like. Alternatively, or in addition, the popularity of a particular word in a job title may influence the feature weight calculation for the particular word. Other factors may also influence the feature weight value associated with a particular vector vocabulary term as described herein.

Alternatively, or in addition, the vector generation unit 250 may also generate a feature weight 256 that is associated with the vector vocabulary term "Agent" 236. Such a feature weight 256 may be generated based on a determination that the body of the job posting associated with the training data item 210f included the term "Agent." Portions of the generated occupation vector 252 that are associated with vector vocabulary 230 terms that are not related to any aspect of the training data item 210f are assigned a value of zero. Various types of calculations may be performed in order to generate a feature weight including, but not limited to, a term frequency, inverse-occupation-frequency, occupation derivative, or the like.

An occupation vector may include feature weights that are based on term frequency. Term frequency is based on a number of occurrences of each respective vector vocabulary 230 term in a job title of a training data item. A term frequency (TF) vector may be initialized as a zero vector with length N, TF=($tf_0$, $tf_1$, . . . , $tf_{N-1}$). Vector vocabulary 230 terms, or features, contained by the job title of a particular training data item are enumerated. If the vector generation unit 250 determines that a term in a training data item job title exists in the vector vocabulary, W, the corresponding ith element in the vector generated for the training data item is set to the frequency that the term appears in the job title. For example, $tf_i$=frequency($W_i$).

Alternatively, or in addition, an occupation vector may include feature weights that are based on an inverse occupation frequency. Inverse occupation frequency, also referred to as an Inverse-DetOc-Frequency (IDF), is based on a number of occupations in the occupation taxonomy where a job title term is present. The inverse occupation frequency, or IDF, may reflect how specific a word is to a particular occupation. An occupation vector using feature weights based on inverse occupation frequency constructs as a vector of length N, IDF=($idf_0$, $idf_1$, . . . $idf_{N-1}$). The occupation frequency, $df_i$, for the ith word $W_i$ in the vector vocabulary is defined as a number of occupations in the occupation taxonomy 260 that the vector vocabulary term appears in. If any samples of a particular occupation can derive a word, then the word appears in the particular occupation. Inverse occupation frequency (IDF) is defined as the inverse occupation frequency (DF), and takes natural log, $idf_i=\log(D/df_i)$, where D is the number of occupations in the occupation taxonomy.

Alternatively, or in addition, an occupation vector may include feature weights that are based on an occupation derivate. Occupation derivative, also referred to as DetOc-Derivative (DD), is based on a density of the respective term across each of the respective occupations in the occupation taxonomy 260. The occupation derivative (DD) reflects how strongly a word $W_i$ can differentiate occupations. An occupation vector using feature weights based on occupation derivative (DD) constructs as a vector of length N, $DD=(dd_0, dd_1, \ldots, dd_{N-1})$. $dd_i$ may be calculated based on the density of the word $W_i$ across all occupations, $DS_i=(ds_{i1}, ds_{i2}, \ldots, ds_{iD})$. $ds_{ij}$ may be the number of exemplars in a particular occupation, containing word Wi divided by the total number of exemplars in the particular occupation. $DS_i$ may then be descending reordered. The D-1 adjacent differences may be calculated as $ds_{ij}+1-ds_{ij}$. Take the largest difference as $dd_i$. The occupation derivative (DD) is normalized by $DD=\log(DD/\min(DD))$.

Alternatively, or in addition, an occupation vector may include feature weights that are based on a combination of two or more types of feature weights. In one implementation, for example, a feature weight may be determined by combining the aforementioned inverse occupation frequency, or IDF, with the occupation derivative, or DD. For example, the feature weight may be determined by calculating the sum of (i) the occupation frequency, or IDF, and (ii) the occupation derivative, or DD. This relationship may be shown as FW=IDF+DD. Alternatively, or in addition, for example, the feature weight may be determined by calculating the sum of (i) the occupation frequency, or IDF, and (ii) three times the occupation derivative, or DD. This relationship may be shown as FW=IDF+DD3. Alternatively, or in addition, for example, the feature weight may be determined by calculating the sum of (i) the occupation frequency, or IDF, and (ii) one-third of the occupation derivative, or DD. This relationship may be shown as FW=IDF+DD/3. The inverse occupation frequency and occupation derivative, used alone or in combination, are beneficial at addressing the problem of the extremely short document classification problem at issue with classifying job titles, where the classification of such job titles, or job queries, may only depend on a small set of words.

Each occupation vector 252 generated by the vector generation unit 250 may be used to train 218 the occupation taxonomy 260. The occupation taxonomy 260 includes a predefined list of occupation codes 262 that each correspond to a particular occupation 264. The training phase includes associating occupation vectors such as occupation vector 252 with a particular occupation in the occupation taxonomy 260. Associating an occupation vector with a particular occupation in the occupation taxonomy 260 may include associating the occupation vector with an occupation code 262, an occupation 264, or both. Alternatively, or in addition, associating an occupation vector with a particular occupation in the occupation taxonomy 260 may include assigning the occupation vector to a particular occupation based on the corresponding occupation code label that is associated with the training data item from which the occupation vector was derived. By way of example, training data items 210*b*, 210*c*, 210*e*, 210*h* may each have been labeled with the occupation of "Patent Attorney" having an occupation code "123". The occupation taxonomy may use the occupation code "123" associated with each respective training data item 210*b*, 210*c*, 210*e*, 210*h* to classify the occupation vectors corresponding to those respective training data items in the occupation taxonomy 260. In this example, the occupation code "123" is used to classify the occupation vectors 270*b*, 270*c*, 270*e*, 270*h* in the occupation "Patent Attorney." In a similar manner, the occupation vectors 270*d*, 270*g* generated based on the training data items 210*d*, 210*g* respectively are classified in the occupation "Software Engineer," the occupation vectors 270*f*, 270*i*, 270*j*, 270*k*, 270*l* generated based on the training data items 210*f*, 210*i*, 210*j*, 210*k*, 210*l* respectively are classified in the occupation "Patent Agent," and the occupation vector 270*a* generated based on the training data item 210*a* is classified under the occupation "Zoo Attendant." The occupation taxonomy 260 is trained when each of the occupation vectors generated based on the set of respective training data items stored in the text corpus are classified using the occupation taxonomy 260.

Figure 3:
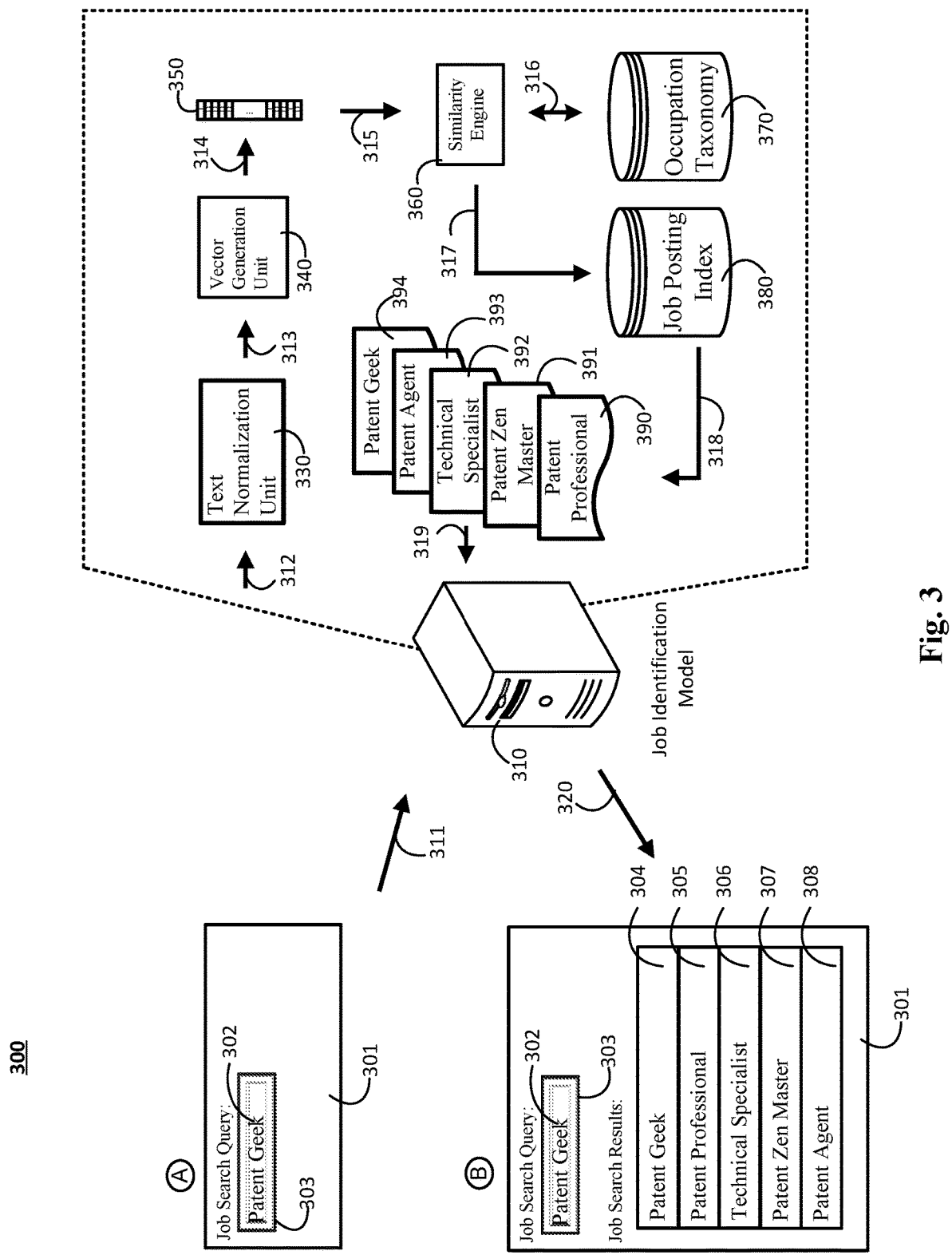
FIG. 3 is an example of a system that executes a job search using a job identification model.

FIG. 3 is an example of a system 300 that executes a job search using a job identification model 310. The system 300 includes a user device that displays a user interface 301 and a server hosting a job identification model 310. The job identification model 310 includes a text normalization unit 330, a vector generation unit 340, a similarity engine 360, a trained occupation taxonomy 370, and a job posting index 380.

A user seeking employment opportunities may have an engineering degree, and participated in an internship at the U.S. Patent and Trademark Office. After the internship, the user may have researched patent law, realized that the user is really interested in patents, but does not have the funds necessary to go to law school, or desire to take student loans. With this background, the user may view himself (or herself) as simply being a "Patent Geek." At stage A, the user seeking employment opportunities may use a user device to access a search interface 301 to determine what jobs are available for a "Patent Geek." In particular, the user may enter a search query 302 "Patent Geek" into the search box 303. The search query 302 term "Patent Geek" may appropriately be characterized as a characteristic of the user, a characteristic of one or more job opportunities, or both. The user device may transmit 311 the search query 302 to a job identification model 310 via one or more networks such as a LAN, a WAN, a cellular network, the Internet, or the like. The user device may include a smartphone, tablet computer, laptop computer, desktop computer, or the like.

The job identification model 310 receives the search query 302 "Patent Geek," and then proceeds to classify the search query "Patent Geek" using the occupation taxonomy 370. Classifying the search query begins by inputting 312 the search query "Patent Geek" into a text normalization unit 330 that is configured to normalize the search query "Patent Geek." Normalizing the search query "Patent Geek" may include cleansing and annotating the search query. The normalization operations performed by the classification unit 330 are the same as those normalization operations described above that the normalization unit 240 performs on a job title.

Classification of the search query includes the use of a vector generation unit 340 to perform feature engineering in order to generate a query vector 350 based on the search query 302. The generated query vector 350 represents the search query "Patent Geek" using multiple numerical values. In some implementations, the vector generation unit 340 may receive 313 the normalized search query from the text normalization unit 330. Alternatively, in other implementations, the vector generation unit 340 may receive a search query that has not undergone the normalization process. The vector generation operations performed by the vector generation unit 340 are the same as the vector generation operations performed by vector generation unit 250 on a training data item job title to generate an occupation vector.

After the query vector 350 is generated, the query vector 350 is input 315 into a similarity engine 360. The similarity engine 360 may then access 316 the occupation taxonomy 370 to determine the correct classification of the query vector 350 within the occupation taxonomy 370. Determining the correct classification of the query vector 350 within the occupation taxonomy may include, for example, the similarity engine 360 calculating, for each particular occupation in the occupation taxonomy 370, a confidence score that is indicative of the likelihood that the query vector 350 is properly classified into the particular occupation. In some implementations, the confidence score that is indicative of the likelihood that the query vector 350 is properly classified into the particular occupation may be expressed in the form of a probability. The respective confidence scores may be determined by analyzing the distance that exists between the query vector 350, and one or more occupation vectors associated with each occupation in the occupation taxonomy 370 during training. The lesser the distance that exists between the query vector 350 and a set of one or more occupation vectors, the higher the confidence score will be.

In some implementations, the similarity engine 360 may determine to classify the query vector 350 into the occupation that is associated with the highest confidence score. Alternatively, or in addition, the similarity engine 360 may determine to classify the query vector 350 into each of the classifications that are associated with a confidence score that exceeds a predetermined threshold.

With reference to FIG. 3, the similarity engine 360 may determine, after evaluating each calculated confidence score, that the query vector 350 is properly classified into the "Patent Agent" occupation. The similarity engine 360 may select the "Patent Agent" occupation because the similarity engine 360 determined that the confidence score indicating that the classification of the query vector 350 into the "Patent Agent" occupation was higher than the confidence score for any other occupations in the occupation taxonomy 370.

The similarity engine 360 may input 317 the selected occupation "Patent Agent" into a job posting index 380. The job posting index 380 may index known job postings based on occupation type using the occupations delineated in the occupation taxonomy 370. The search of the job posting index 380 may result in the identification of one or more job postings 390, 391, 392, 393, 394. A set of search results that reference the job postings 390, 391, 392, 393, 394 may be generated 319. At Stage B, the generated search results may then be provided 320 to the user device via one or more networks such as a LAN, a WAN, a cellular network, the Internet, or the like. The search results may be displayed via the user interface 301 on the user device. The search results may include a variety of job postings that are directed to the same occupation as the user's search query "Patent Geek" but that include job postings that include one or more job titles that use different words than the user's query. For example, the search results may include job postings with a job title of "Patent Geek," "Patent Professional," "Technical Specialist," "Patent Zen Master," and "Patent Agent." Though each of these jobs use different words to describe the job title, each of these jobs are directed to the same occupation—i.e., "Patent Agent."

In some implementations, other search results may also be included in the set of generated search results. For instance, the other search results may include search results obtained using keyword-based searching. In such instances, the search results identified by the job identification model may be promoted over the search results identified using keyword based searching methods. Promotion of a search result may be achieved by boosting a ranking score for the search results that are to be promoted.

Figure 4:
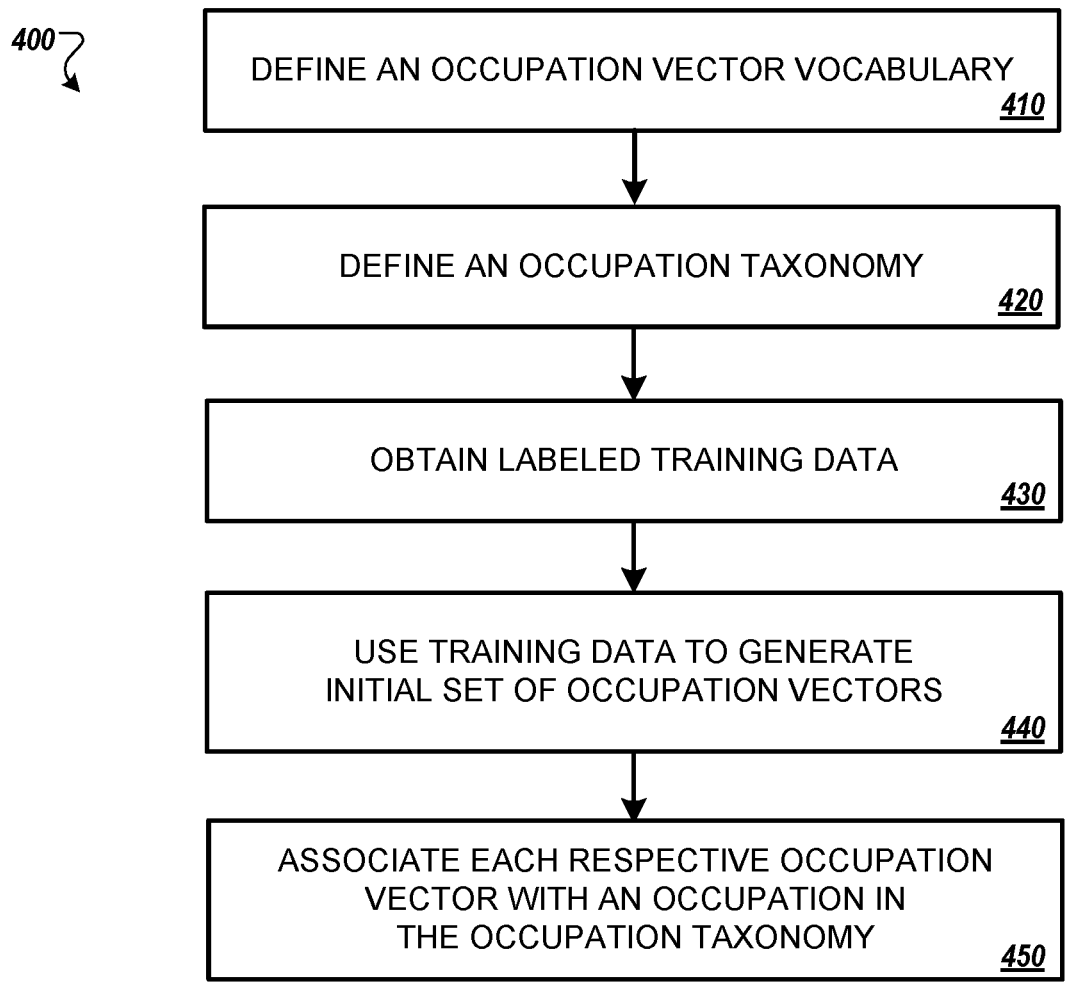
FIG. 4 is a flowchart of an example of a process for training an occupation taxonomy.

FIG. 4 is a flowchart of an example of a process 400 for training an occupation taxonomy. Generally, the process 400 includes defining an occupation vector vocabulary 410, defining an occupation taxonomy 420, obtaining labeled training data 430, using the labeled training data to generate an initial set of occupation vectors 440, and associating each respective occupation vector with an occupation in the occupation taxonomy.

In more detail, the process 400 may begin at stage 410 by defining an occupation vector vocabulary. The occupation vector vocabulary may be defined based on the text of training data items stored in a text corpus. Alternatively, or in addition, the occupation vector vocabulary may be defined based on text included in data items that are not training data items stored in the text corpus. For example, in one implementation, the occupation vector vocabulary may be based on the set of words defined in one or more dictionaries. In some implementations, the occupation vector vocabulary may include every word that appears in the text of training data items, one or more dictionaries, or a combination thereof. The vector vocabulary terms may include unigrams, bigrams, skip-1 bigrams stemmed using a Porter Stemmer algorithm, or a combination thereof. The occupation vector vocabulary may be used as the vector vocabulary for both occupation vectors and query vectors.

The process may continue at stage 420 by defining an occupation taxonomy. Alternatively, the occupation taxonomy may be predefined in advance of defining the occupation vector vocabulary, and independent of process 400. For example, in some implementations, a predefined occupation taxonomy may be obtained a third party source. The occupation taxonomy includes a list of occupation codes that each correspond to a particular occupation. The list of occupation codes may be manually generated by a team of expert users that review and analyze job postings, job titles, or the like. Alternatively, or in addition, a list of occupation code may be automatically generated by one or more computers that have performed text analysis on a batch of job listings, job titles, or the like.

The process may continue at stage 430 by obtaining labeled training data items. Obtaining labeled training items may include accessing a text corpus that stores the labeled training data items that each correspond to a particular job posting. Each labeled training data item may include (i) a job title, and (ii) and an occupation code. The occupation code may be manually assigned to the label training data item using a training data management tool. The occupation code may correspond to a particular occupation of the multiple occupations organized by an occupation taxonomy. The labeled training data items may be obtained from job postings provided by multiple different employers, and be comprised of multiple different job opportunities. Alternatively, or in addition, the labeled training items may also be comprised of job descriptions from resumes, job search queries, or the like. The occupation code associated with each labeled training data item provides data that can be used to train the occupation taxonomy. In some implementations, obtaining labeled training data items may include obtaining a set of labeled training data items that were previously labeled with a particular occupation code from one or more third party sources.

The process may continue at stage 440 by using the obtained labeled training data items to generate an initial set of occupation vectors. A vector generation unit may receive the obtained labeled training data items, and generate, for each labeled training data item, an occupation vector. Each occupation vector is a numerical representation of an obtained labeled training data item. Each occupation vector may include a feature value for each term in an occupation vector vocabulary. Generating an occupation vector includes calculating the feature value that corresponds to each term in the occupation vector vocabulary. Each feature value may include a feature weight that is indicative of a particular relationship between a particular training data item and a particular term in the occupation vector vocabulary. Generating an occupation vector may include calculating one or more different types of features weights. For example, the one or more different types of feature weights may include features weights based on, for example, a term frequency, an inverse occupation frequency, an occupation derivative, or the like. The generated occupation vectors may later be mapped to a numerical feature space to allow for classification of query vectors, classification of newly identified occupation vectors, or the like.

The process may continue at stage 450 by associating each respective occupation vector with an occupation in the occupation taxonomy. Associating an occupation vector with an occupation in the occupation taxonomy may include, for example, assigning an occupation vector to a particular occupation in the occupation taxonomy. Assignment of an occupation vector to a particular occupation in the occupation taxonomy may be based on the occupation code that is associated with the training data item from which the occupation vector was derived.

Figure 5:
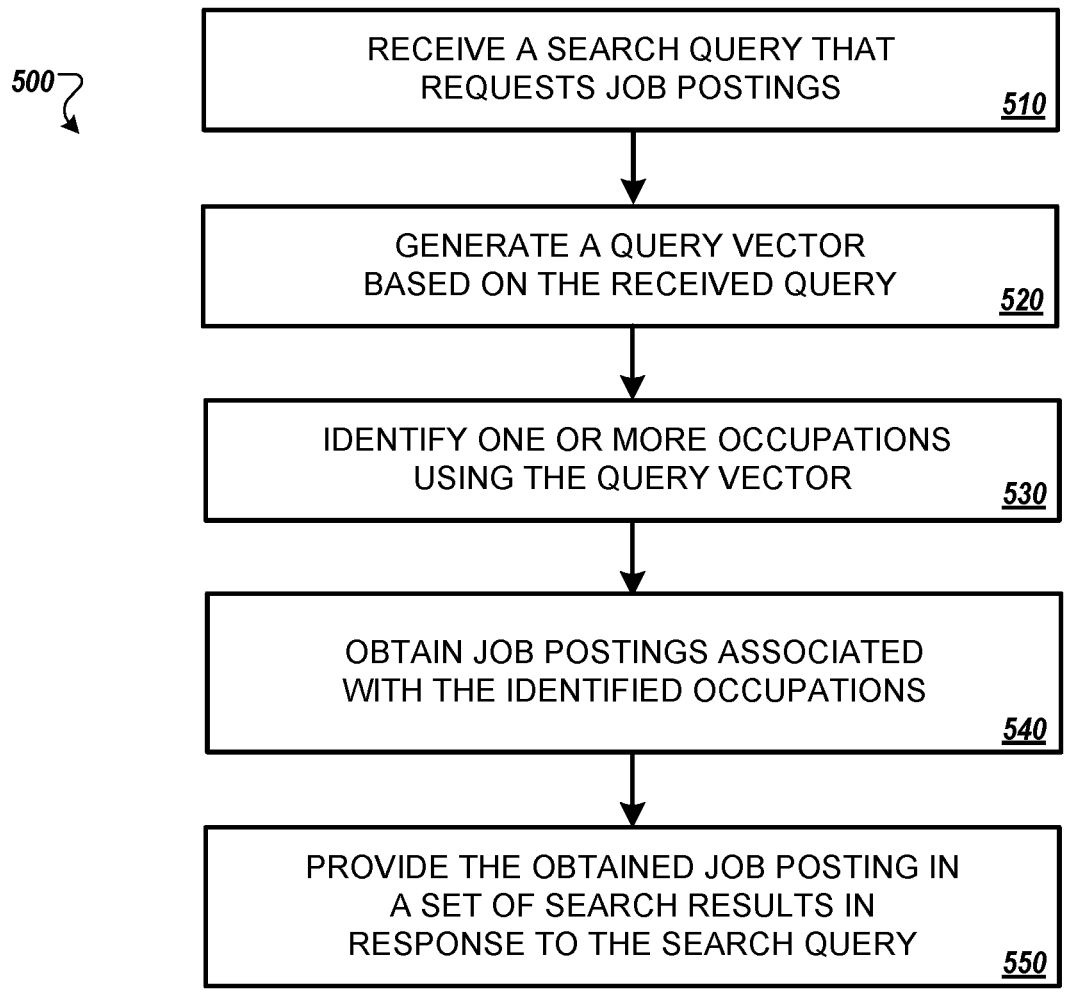
FIG. 5 is a flowchart of an example of a process for performing a job search using a job identification model.

FIG. 5 is a flowchart of an example of a process 500 for performing a job search using a job identification model. Generally, the process 500 includes receiving a search query that requests job postings 510, generating a query vector based on the received query 520, identifying one or more occupations using the query vector 530, obtaining job postings associated with the identified occupations 540, and providing the obtained job postings in a set of search results in response to the search query 550.

In more detail, the process 500 begins at stage 510 with a job identification model receiving a search query that requests job postings from a user device. The search query requesting job postings may include, for example, a string of one or more characters related to a job opportunity. For example, the string of one or more characters may include a job title of job opportunities sought by the user of the user device, a characteristic of one or more job opportunities sought by the user of the user device, or the like. Alternatively, or in addition, the string of one or more characters may be indicative of a particular characteristic of the user who submitted the query. For example, a user may submit a search query with a string of one or more characters such as "Patent Geek." The string "Patent Geek," though descriptive of an attribute of the user, may be useful in identifying one or more job opportunities that may correspond to the user's attribute when classified into a particular occupation in the occupation taxonomy.

The process 500 may continue at stage 520 with the job identification model generating a query vector based on the received search query. The query vector may be generated using feature engineering techniques to generate multiple numerical values that are representative of the search query. A query vector may include a feature value for each term in a predefined vector vocabulary. In some implementations, the predefined vector vocabulary may include an occupation vector vocabulary that was generated during training of an occupation taxonomy. Generating the query vector includes calculating a feature value that corresponds to each term in the vector vocabulary. Each feature value may include a feature weight that is indicative of a particular relationship between the received query and a particular term in the vector vocabulary. Generating a query vector may include calculating one or more different types of feature weights. For example, the one or more different types of feature weights may include feature weights based on, for example, a term frequency, an inverse occupation frequency, an occupation derivative, or the like. The generated query vector may later be mapped to a numerical feature space to allow for classification of the query vector amongst multiple occupation vectors that have been associated with various occupations in the occupation taxonomy.

The process 500 may continue at stage 530 with the job identification model identifying one or more occupations using the generated query vector. For example, the job identification model may use a similarity engine to calculate, for each particular occupation in the occupation taxonomy, a confidence score that is indicative of the likelihood that the query vector is properly classified into the particular occupation. The confidence score may be expressed in terms of a probability that the query vector is properly classified into the particular occupation. Similarity determinations may be based, at least in part, by projecting the query vector onto a numerical feature space that includes each of the occupation vectors classified during training of the occupation taxonomy. Similarity determinations may include determining the distance between the query vector and one or more occupation vectors. The lesser the distance that exists between the query vector 350 and a set of one or more occupation vectors, the higher the confidence score will be.

Once a confidence score has been calculated for each of the occupations that is indicative of whether the query vector properly belongs to the respective occupation, the similarity engine may evaluate the calculated confidence scores. In some implementations, the similarity engine may determine that the query vector belongs to the occupation that is associated with the highest confidence score. Alternatively, or in addition, the similarity engine may determine that the query vector belongs to multiple different occupations that are each associated with a confidence score that exceeds a predetermined threshold. The similarity engine may then return the occupation(s) that the query vector belongs to for use in retrieving job postings that are relevant to the received job search query.

The process may continue at stage 540 with the job identification model obtaining job postings associated with the occupation(s) identified, and returned, by the similarity engine. The job identification model may use the occupation(s) received from the similarity engine to search a job posting index that indexes job postings based on occupation type. In response to the search, the job posting index may return references to one or more job postings that are related to the occupation returned from the similarity engine. A set of search results can be generated based on the references to job postings returned from the job postings index. And, the generated set of search results that includes a reference to each of the obtained job postings can be provided 550 to the user device in response to the query.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A method comprising:
   defining a vector vocabulary;
   defining an occupation taxonomy that includes multiple different occupations;
   obtaining multiple labeled training data items, wherein each labeled training data item is associated with at least (i) a job title, and (ii) an occupation, wherein the occupation includes a category that encompasses multiple job titles that describe the same job;
   generating, for each of the respective labeled training data items, an occupation vector that includes a feature weight for each respective term in the vector vocabulary that is based on (i) a value indicating an inverse occupation frequency that is determined based on a number of occupations in the occupation taxonomy where each respective term in the job title of the respective training data item is present and (ii) a value representing an occupation derivative that is based on a density of each respective term in the job title of the respective training data item across each of the respective occupations in the occupation taxonomy;
   associating each respective occupation vector with an occupation in the occupation taxonomy based on the occupation of the labeled training data item used to generate the occupation vector;
   receiving a search query that includes a string related to a characteristic of one or more potential job opportunities;
   generating a first vector based on the received query;
   determining, for each respective occupation of the multiple occupations in the occupation taxonomy, a confidence score that is indicative of whether the query vector is correctly classified in the respective occupation;
   selecting the particular occupation that is associated with the highest confidence score;
   obtaining one or more job postings using the selected occupation; and
   providing the obtained job postings in a set of search results in response to the search query.

2. The method of claim 1, wherein defining a vector vocabulary includes generating a vector vocabulary that includes terms that are present in at least one training data item stored in a text corpus and terms that are not present in at least one training data item stored in the text corpus.

3. The method of claim 1, wherein defining a vector vocabulary includes generating a vector vocabulary that includes only terms that are present in at least one training data item stored in a text corpus.

4. The method of claim 1, wherein the feature weight is based on a sum of (i) the value representing the inverse occupation frequency, and (ii) one-third of the value representing the occupation derivative.

5. A system comprising:
   one or more processors; and
   one or more computer storage media, the computer storage media comprising instructions that, when executed by the one or more processors, cause the one or more processors to perform operations, the operations comprising:
   defining a vector vocabulary;
   defining an occupation taxonomy that includes multiple different occupations;
   obtaining multiple labeled training data items, wherein each labeled training data item is associated with at least (i) a job title, and (ii) an occupation, wherein the occupation includes a category that encompasses multiple job titles that describe the same job;
   generating, for each of the respective labeled training data items, an occupation vector that includes a feature weight for each respective term in the vector vocabulary that is based on (i) a value indicating an inverse occupation frequency that is determined based on a number of occupations in the occupation taxonomy where each respective term in the job title of the respective training data item is present and (ii) a value representing an occupation derivative that is based on a density of each respective term in the job title of the respective training data item across each of the respective occupations in the occupation taxonomy;
   associating each respective occupation vector with an occupation in the occupation taxonomy based on the occupation of the labeled training data item used to generate the occupation vector;
   receiving a search query that includes a string related to a characteristic of one or more potential job opportunities;
   generating a first vector based on the received query;
   determining, for each respective occupation of the multiple occupations in the occupation taxonomy, a confidence score that is indicative of whether the query vector is correctly classified in the respective occupation;
   selecting the particular occupation that is associated with the highest confidence score;
   obtaining one or more job postings using the selected occupation; and providing the obtained job postings in a set of search results in response to the search query.

6. The system of claim 5, wherein defining a vector vocabulary includes generating a vector vocabulary that includes terms that are present in at least one training data item stored in a text corpus and terms that are not present in at least one training data item stored in the text corpus.

7. The system of claim 5, wherein defining a vector vocabulary includes generating a vector vocabulary that includes only terms that are present in at least one training data item stored in a text corpus.

8. The system of claim 5, wherein the feature weight is based on a sum of (i) the value representing the inverse occupation frequency, and (ii) one-third of the third value representing the occupation derivative.

9. A non-transitory computer-readable medium storing software comprising instructions executable by one or more computers which, upon such execution, cause the one or more computers to perform operations comprising:

defining a vector vocabulary;

defining an occupation taxonomy that includes multiple different occupations;

obtaining multiple labeled training data items, wherein each labeled training data item is associated with at least (i) a job title, and (ii) an occupation, wherein the occupation includes a category that encompasses multiple job titles that describe the same job;

generating, for each of the respective labeled training data items, an occupation vector that includes a feature weight for each respective term in the vector vocabulary that is based on (i) a value indicating an inverse occupation frequency that is determined based on a number of occupations in the occupation taxonomy where each respective term in the job title of the respective training data item is present and (ii) a value representing an occupation derivative that is based in part on a density of each respective term in the job title of the respective training data item across each of the respective occupations in the occupation taxonomy;

associating each respective occupation vector with an occupation in the occupation taxonomy based on the occupation of the labeled training data item used to generate the occupation vector;

receiving a search query that includes a string related to a characteristic of one or more potential job opportunities;

generating a first vector based on the received query;

determining, for each respective occupation of the multiple occupations in the occupation taxonomy, a confidence score that is indicative of whether the query vector is correctly classified in the respective occupation;

selecting the particular occupation that is associated with the highest confidence score;

obtaining one or more job postings using the selected occupation; and providing the obtained job postings in a set of search results in response to the search query.

10. The computer-readable medium of claim 9, wherein defining a vector vocabulary includes generating a vector vocabulary that includes terms that are present in at least one training data item stored in a text corpus and terms that are not present in at least one training data item stored in the text corpus.

11. The computer-readable medium of claim 9, wherein defining a vector vocabulary includes generating a vector vocabulary that includes only terms that are present in at least one training data item stored in a text corpus.

12. The computer-readable medium of claim 9, wherein the feature weight is based on a sum of (i) the value representing the inverse occupation frequency, and (ii) one-third of the value representing the occupation derivative.

* * * * *

UNITED STATES PATENT AND TRADEMARK OFFICE
CERTIFICATE OF CORRECTION

PATENT NO. : 10,643,183 B2
APPLICATION NO. : 15/296230
DATED : May 5, 2020
INVENTOR(S) : Tian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 329 days.

Signed and Sealed this
Thirteenth Day of December, 2022

*Katherine Kelly Vidal*

Katherine Kelly Vidal
*Director of the United States Patent and Trademark Office*